United States Patent [19]
Jensen

[11] Patent Number: 5,460,239
[45] Date of Patent: Oct. 24, 1995

[54] AIR COMPRESSOR BASED VEHICLE DRIVE SYSTEM

[76] Inventor: Maurice W. Jensen, 6054 Glenway La., Greendale, Wis. 53129

[21] Appl. No.: 204,749

[22] Filed: Mar. 2, 1994

[51] Int. Cl.⁶ .................................................. B60K 3/04
[52] U.S. Cl. ............................ 180/302; 60/410; 60/416; 74/572
[58] Field of Search .................................. 180/307, 302, 180/165; 74/572, 573 F, 574; 60/408, 410, 414, 416

[56] References Cited

U.S. PATENT DOCUMENTS

| | | | |
|---|---|---|---|
| 865,496 | 9/1907 | Herrington | 180/302 |
| 3,693,351 | 9/1972 | Minkus | 60/57 R |
| 3,882,950 | 5/1975 | Strohlein | 74/572 |
| 4,043,126 | 8/1977 | Santos | 60/407 |
| 4,163,367 | 8/1979 | Yeh | 180/414 |
| 4,355,508 | 10/1982 | Blenke | 180/302 |
| 4,383,589 | 5/1983 | Fox | 180/165 |
| 4,406,121 | 9/1983 | Pelto | 60/330 |
| 4,629,947 | 12/1986 | Hammerslag et al. | 318/161 |
| 4,730,154 | 3/1988 | Pinson | 74/572 |
| 4,860,611 | 8/1989 | Flanagan et al. | 74/574 |
| 4,886,430 | 12/1989 | Veronesi et al. | 417/423.13 |
| 5,214,358 | 5/1993 | Marshall | 318/139 |

FOREIGN PATENT DOCUMENTS 0269757   4/1927   United Kingdom ..................... 60/410

OTHER PUBLICATIONS

"A different spin on an EV battery" IEEE Spectrum, Nov., 1992, p. 100.

*Primary Examiner*—Anne Marie Boehler
*Attorney, Agent, or Firm*—Andrus, Sceales, Starke & Sawall

[57] ABSTRACT

A vehicle drive system fueled by a source of compressed air includes a main air motor connected with and adapted to drive a vehicle wheel, a combined rotatable flywheel-impeller assembly acting in turbine fashion during a charge-up phase to spin-up with compress air from the source, and acting in compressor fashion to alternately compress ambient air from the source and subsequently deliver the resulting compressed air to the air motor while being disposed in a substantial vacuum and an air tank connected to the main air motor and adapted to store compressed air from the flywheel-impeller assembly. A controller is connected to the flywheel-impeller assembly, air tank and main air motor to automatically and continuously control the flow of compressed air between the flywheel-impeller assembly and the air tank, and between the air tank and main air motor in response to the demand for compressed air required by the main air motor to drive the vehicle wheel.

22 Claims, 7 Drawing Sheets

AIR COMPRESSOR BASED VEHICLE DRIVE SYSTEM

FIELD OF THE INVENTION

The invention relates generally to vehicle drive systems, and more particularly, pertains to non-polluting vehicle drive systems based on compressed air and kinetic energy stored in rotating masses.

BACKGROUND OF THE INVENTION

It is well known that the present day internal combustion engine as used to propel an automobile or other vehicle is a less than ideal prime mover. Gasoline power inherently involves a high degree of air and noise pollution as well as attendant refinery operations and is relatively energy inefficient. Accordingly, various electrically powered and compressed air powered vehicle drive systems have been designed with the objective of minimizing these problems and concurrently meeting other ecological concerns.

One example of an electrically powered vehicle drive system is disclosed in U.S. Pat. No. 4,629,947 to Hammerslag et al issued Dec. 16, 1986. In this design, a conventional flywheel constitutes one chargeable energy source which is discharged or slowed down as energy is dissipated during vehicle acceleration and recharged or sped up when the vehicle is decelerating. A battery for energizing an electric motor constitutes another rechargeable energy source which is discharged during vehicle use, but can be recharged or replaced when the vehicle is idle. In U.S. Pat. No. 5,214,358 to Marshall issued May 25, 1993, a motor vehicle includes an electromagnetic transmission system utilizing an electrical motor adapted to drive the wheels of the vehicle. A conventional flywheel is spun up by a separate electrical motor to provide an auxiliary power source used to boost the acceleration of the vehicle.

An example of a compressed air powered vehicle drive system is shown in U.S. Pat. No. 865,496 to Herrington issued Sep. 10, 1907 wherein an electric motor is used to drive the main air compressor connected to the air motor propelling the vehicle. Air cylinders are also utilized to provide an alternative source of compressed air power when the vehicle is travelling downgrade and the electric motor is shut off. In U.S. Pat. No. 3,693,351 to Minkus issued Sep. 26, 1972, a regenerative air motor includes a pair of air cylinders, one of which serves as a compressor to return air to a compressed air tank during periods when the automobile is not using full motor power. As in the Herrington patent discussed above, the compressor which supplies compressed air to the air tank is driven by a small engine or motor.

From the foregoing, it can be appreciated that various attempts have been made by the prior art to provide an alternative or adjunct to an internal combustion engine which defines the primary driving force in a vehicle drive system. However, there remains a need in this developing art for an energy efficient system where no chemical action occurs in the vehicle for drive purposes from combustion, batteries or fuel cells. It is further desirable that no high, potentially dangerous electric fields, or components thereof, AC, DC, or magnetic are generated or conducted in the vehicle. It is also highly desirable that such a total system is ecologically adept at utilizing an abundant, natural source of fuel, namely air, which is most compatible with human health and behavior.

SUMMARY OF THE INVENTION

The vehicle drive system of the present invention advantageously provides a safe, non-polluting, energy efficient solution to the problems heretofore generated by the internal combustion engine. It is noteworthy that such a system can store the energy equivalent of a tank of gasoline at about the same cost, can be implemented with a slight increase in component weight and provides approximately the same driving capability in handling and range.

These and other aspects of the invention are realized in a vehicle drive system fueled by a source of air comprising a vehicle drive wheel, a main air motor connected with and adapted to drive the wheel and a combined rotatable flywheel-impeller assembly acting in turbine fashion during a charge-up phase to spin-up with compressed air from the source and acting in a compressor fashion to alternately compress ambient air from said source and subsequently deliver the resulting compressed air to said air motor while being periodically disposed in a substantial vacuum. An air tank is connected to the main air motor and is adapted to store compressed air from the flywheel-impeller assembly. A controller is connected to the flywheel-impeller assembly, air tank and main air motor to automatically and continuously control the flow of compressed air between the flywheel-impeller assembly and the air tank and between the air tank and the main air motor in response to the demand for compressed air required by the main air motor to drive the wheel.

The key element in the inventive vehicle drive system is a combined or integrated flywheel-impeller arrangement which rotates in an evacuated casing during a portion of a run phase and provides turbine incipient action during a charge-up phase and impeller-compressor action during another portion of the run phase. A spin-up valve is connected to the casing for adjusting the velocity of outside air delivered thereto. The flywheel-impeller is comprised of three concentric rings which are formed internally with a series of involute passages through which outside air is forced. Three different materials are used in the flywheel-impeller to fulfill the multiple constraints imposed by the needs of minimum weight, maximum kinetic energy and maximum capability to withstand the extant centrifugal forces. To minimize friction and windage, the flywheel-impeller is supported on a plurality of aligned bearings which spin freely in retaining rings disposed between the casing and the flywheel-impeller.

The invention contemplates a pressure regulated valve, a pre-manifold regulated chamber and a throttle valve connected serially between the air tank and the main air motor. The main air motor is provided with an intake manifold adapted to convert compressed air via the throttle valve to torque deliverable to the vehicle drive wheel. A supplementary air motor is connected between the pressure regulated valve and the pre-manifold regulated chamber and a generator driven by the supplementary air motor defines a source of electrical energy for the vehicle accessories.

In a highly preferred embodiment of the invention, a vehicle drive system fueled by air comprises a vehicle drive wheel, an air motor connected with and adapted to drive the wheel and a casing having a first inlet for receiving air from a fuel source during a charge-up phase and a second inlet for receiving air from an ambient source during a run phase having a first mode for compressing air from the ambient source and a second mode in which the casing is periodically evacuated to deliver compressed air only to the air motor. A pair of contiguous, counter-rotating flywheel-impellers communicate with each other and are adapted to compress air in the casing during the first mode of the run phase. An air tank is connected with the casing for receiving and storing compressed air deliverable to the air motor. A controller is operable to control the flow of compressed air between the casing and the air tank and between the air tank and air motor in response to the demand required by the air motor to drive the vehicle wheel.

In the preferred form, each of the flywheel-impellers are caused to spin at relatively the same speed in opposite directions. The momentum generated by the flywheel-impellers produces opposing vector quantities which effectively eliminate instabilities in the vehicle caused by gyroscopic precession without affecting the kinetic energy stored therein.

Also in the preferred form, the flywheel-impellers are mounted for rotation in the same horizontal plane since this arrangement is best suited for an automobile. However, the invention also contemplates the mounting of the flywheel-impellers in coaxial relationship about either a vertical or horizontal axis in larger vehicles such as four wheel drives, trucks and buses.

The essence of this drive system is the storage of kinetic energy in rotating flywheel(s) with air transmission to using subsystems. It is believed that this essential characteristic is unique in that the flywheel(s) are impellers of centrifugal compressor(s). The impellers initially are spun up by introduction of high pressure air from a stationary supply provided by distributed facilities. This is similar to the service provided by a gas station in the fueling of gasoline powered automobiles or battery charging for electric vehicles.

After spin-up, and pressurization of auxiliary tanks, the system uses computer control of pneumatic valves, in accordance with various pre-planned scenarios of automotive situations and demands to stretch the range as much as the stored energy permits. Air from outside the vehicle is then sucked through the compressors, then to a holding tank for quick availability, then to an accelerator control, and then into a pressure-to-rotation converter. This converter could range in complexity from a rather minor adaptation of a 4-cylinder IC engine to a major development of an air turbine with torque matching to the wheels. The engine already has the interfaces with torque control to the wheels worked out. In the process, the rotating masses lose speed and energy which ultimately must be replenished by the vehicle/facility re-spin system.

BRIEF DESCRIPTION OF THE DRAWINGS

The invention will become better understood by reference to the following detailed description of the preferred exemplary embodiment when read in conjunction with the appended drawing, wherein like numerals denote like elements and.

DETAILED DESCRIPTION OF THE PREFERRED EMBODIMENTS

Figure 1:
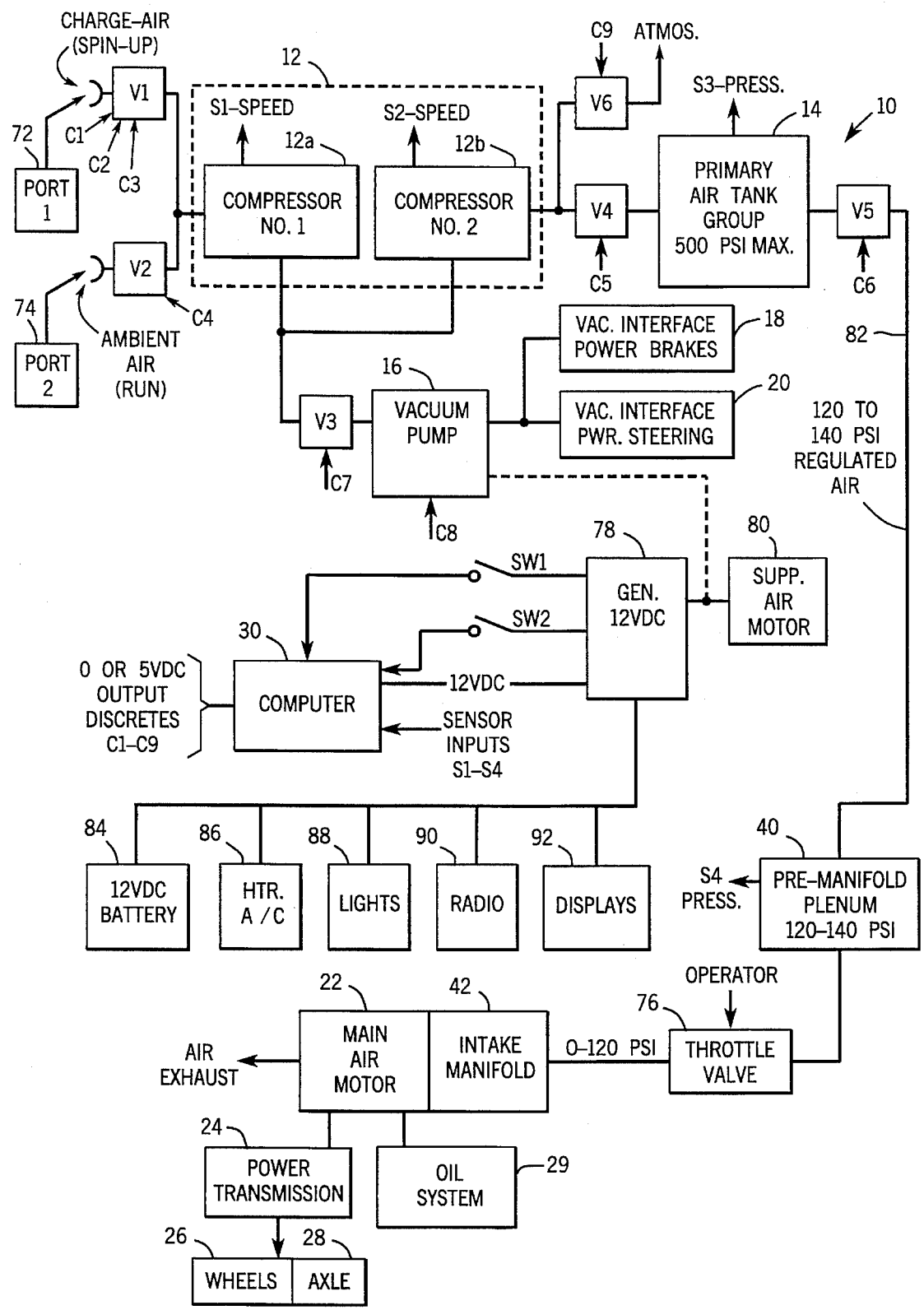
FIG. 1 is a block diagram of a vehicle drive system embodying the present invention.

Referring now to the block diagram in FIG. 1, a vehicle drive system 10 embodying the present invention in its most basic form suitably comprises a combined flywheel-impeller assembly 12 for processing a source of air in a turbine incipient action and a compressor resultant action to produce compressed air which is delivered and stored in one or more storage tanks 14. Flywheel-impeller assembly 12 is periodically disposed in a substantial vacuum provided by a vacuum pump 16 which also interfaces with the power brakes 18 and power steering 20 of the vehicle. Compressed air from tank(s) 14 is regulated and controllably delivered to a pressure-to-torque converter in the form of a main air motor 22 which in turn delivers a driving force via a power transmission 24 to the wheels 26 and the drive axle 28 of the vehicle. A computer or microprocessor 30 is connected to flywheel-impeller assembly 12, air tank(s) 14 and main air motor 22 and has a series of output discretes C1–C9 and sensor inputs S1–S4 operable to automatically and continuously control the flow of compressed air between flywheel-impeller assembly 12 and air tank(s) 14 and between air tank(s) 14 and main air motor 22 in response to the demand for compressed air required by main air motor 22 to drive vehicle wheels 26.

Figure 2:
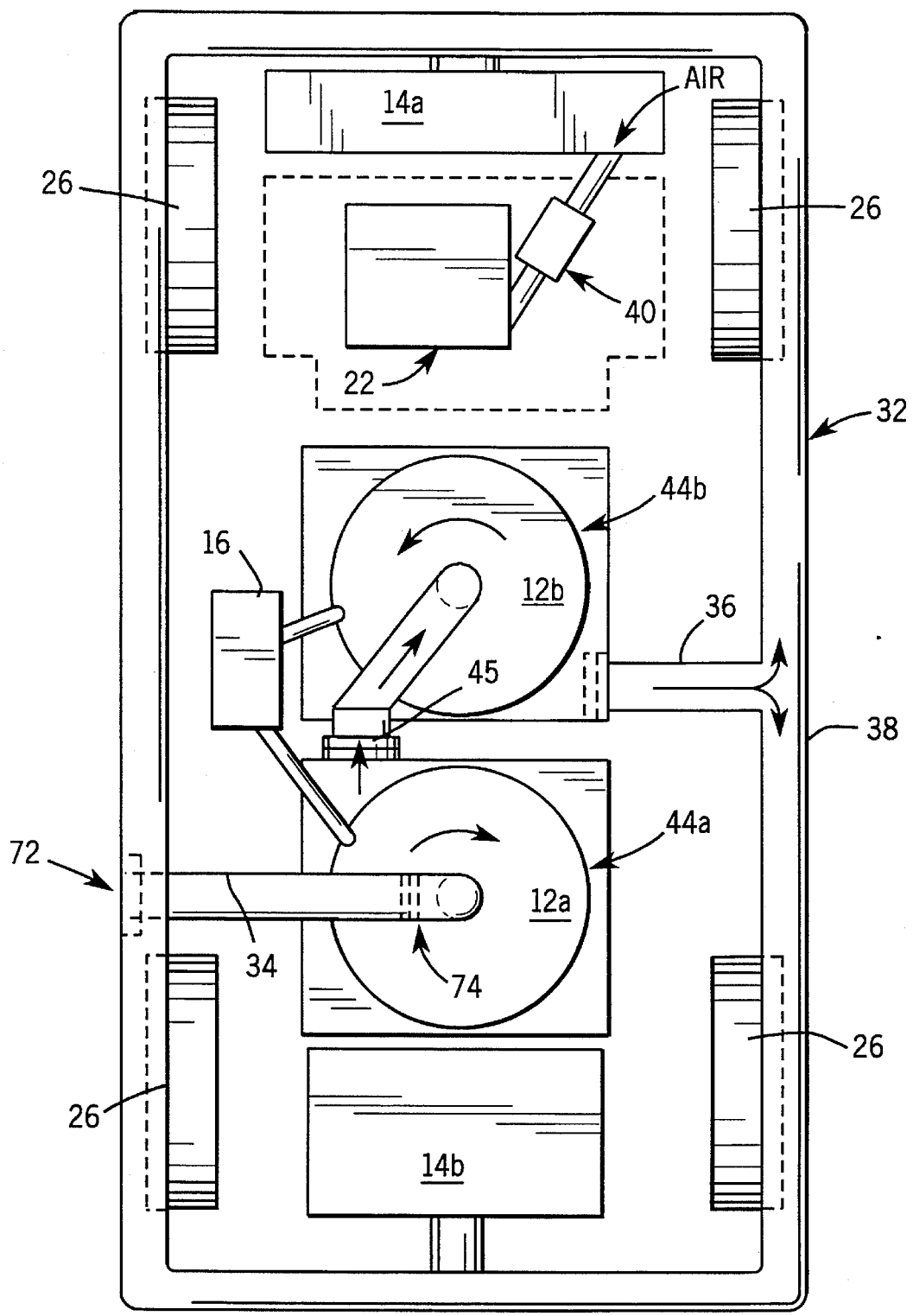
FIG. 2 is a top, plan view of a vehicle showing a possible arrangement of certain components of the vehicle drive system.
Figure 3:
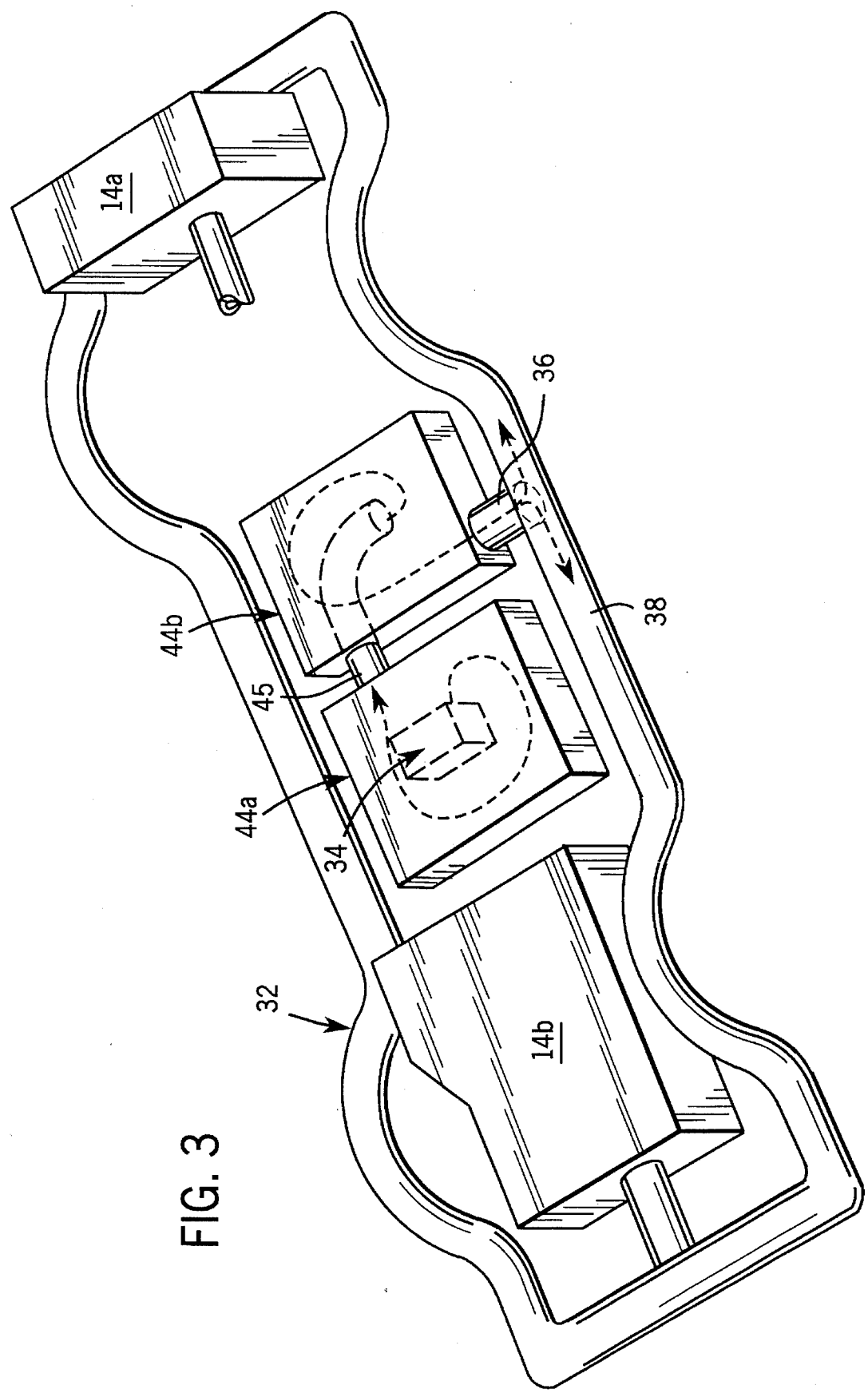
FIG. 3 is a top, perspective view of a vehicle chassis employing the present invention.

FIGS. 2 and 3 illustrate a possible arrangement of the major mechanical components of vehicle drive system 10 as located beneath the vehicle floor with respect to a chassis or framework 32 supported by vehicle wheels 26 and reinforced by welded tabs or crossbraces as desired. More particularly, an air inlet conduit 34 extends laterally of chassis 32 for introducing outside air to be compressed into flywheel-impeller assembly 12, the resulting compressed air being exhausted through an air outlet conduit 36 and into a tubular air conduit system 38 forming the periphery of chassis 32. Air conduit system 38 is in communication with a first air tank 14a at the front of the vehicle and a second air tank 14b at the rear of the vehicle such that compressed air delivered from flywheel-impeller assembly 12 is stored jointly throughout air conduit system 38 and both air tanks 14a, 14b. Tank(s) 14 and air conduit system 38 are preferably formed from aluminum which provides the proper strength to withstand pressures up to 500 p.s.i. without being unduly heavy. The stored compressed air is controllably regulated for delivery to a pre-manifold regulated chamber or plenum 40 after which it is suitably throttled and delivered into the intake manifold 42 of main air motor 22 in the form of a converted 4-cylinder engine with cam adaptations for 2-cycle operation at a predetermined air pressure. Air motor 22 suitably interfaces with power transmission 24 delivering a motive power to wheels 26 and drive axle 28.

Figure 4:
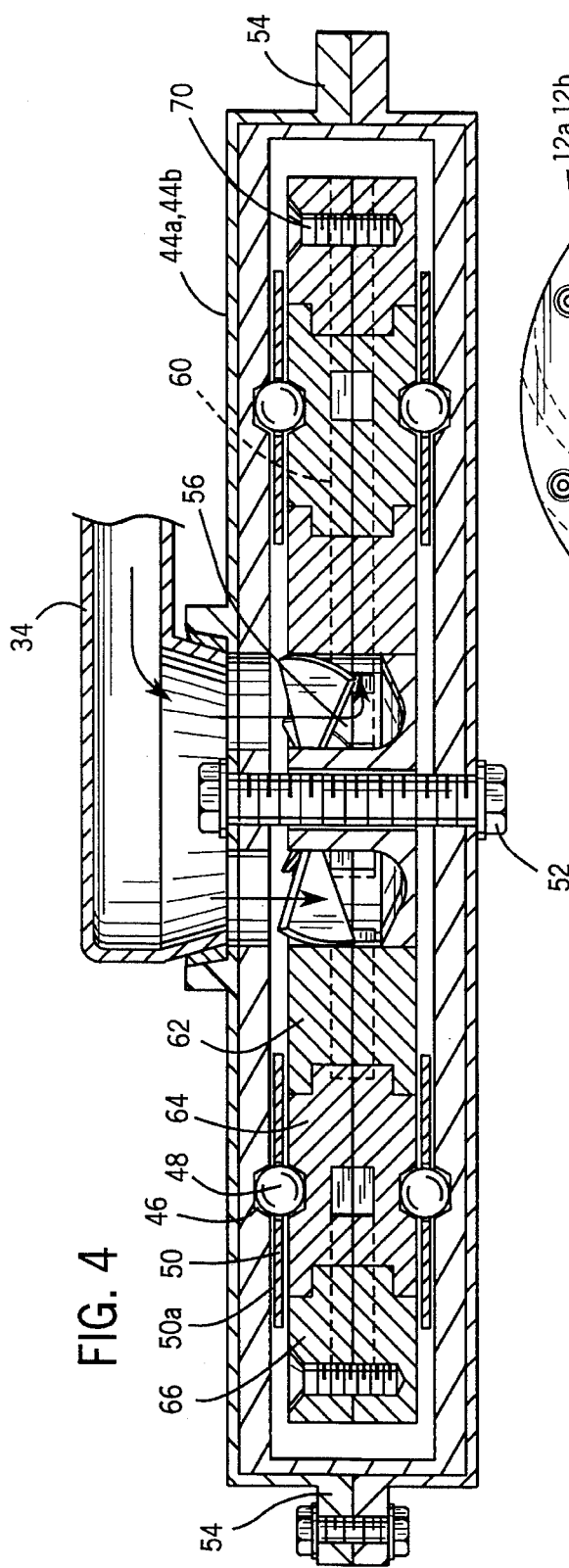
FIG. 4 is a cross-sectional view of a flywheel-impeller as mounted in a casing according to the present invention.

As best seen in FIGS. 2–4, combination flywheel-impeller assembly 12 comprises a pair of contiguous or adjacently disposed, coplanar flywheel-impellers 12a, 12b, each of which is mounted for rotation about a vertical axis in a horizontally disposed casing 44a, 44b. Each casing 44a, 44b is preferably fabricated of titanium or carbon composite and functions to collect compressed air in a deliverable stream with sufficient rigidity to withstand any fragmentation of moving parts therein. Air inlet conduit 34 is joined to rearwardmost casing 44a while outlet air conduit is connected to forwardmost casing 44b, both casings being in communication with vacuum pump 16 and with each other by means of a recovery chute 45. Each of casings 44a, 44b and flywheel-impellers 12a, 12b are split horizontally for ease of manufacturing and assembly and are formed with complementary trapezoidal grooves 46 for retaining a series of upper and lower bearings 48 which are separated from each other at 45° intervals by a pair of disk-like retainer rings 50. Ball bearings 48 and retainer rings 50 roll in the same direction as each flywheel-impeller 12a, 12b and serve to minimize the friction caused by the components sliding against each other. A clamping post 52 along with a clamping flange 54 at the outer part of casing 44a, 44b holds the major parts of the assembly together with the proper pressure so they run freely.

Figure 5:
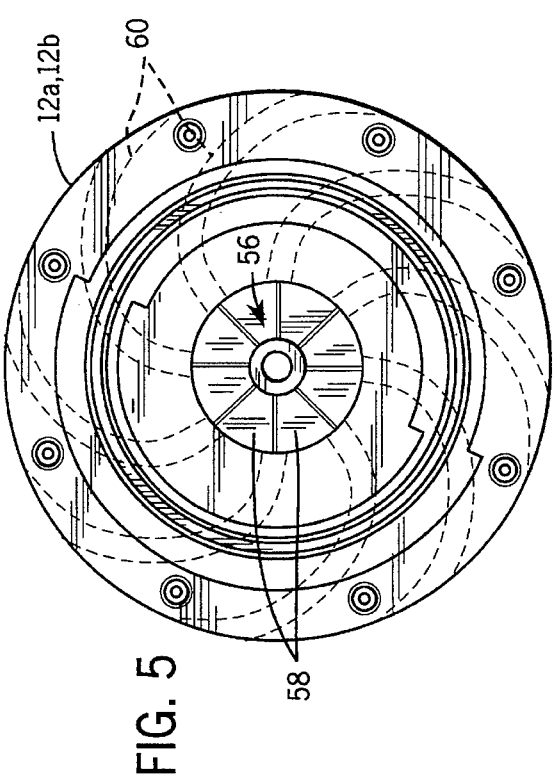
FIG. 5 is a top, plan view of a flywheel-impeller used in the present invention.
Figure 6:
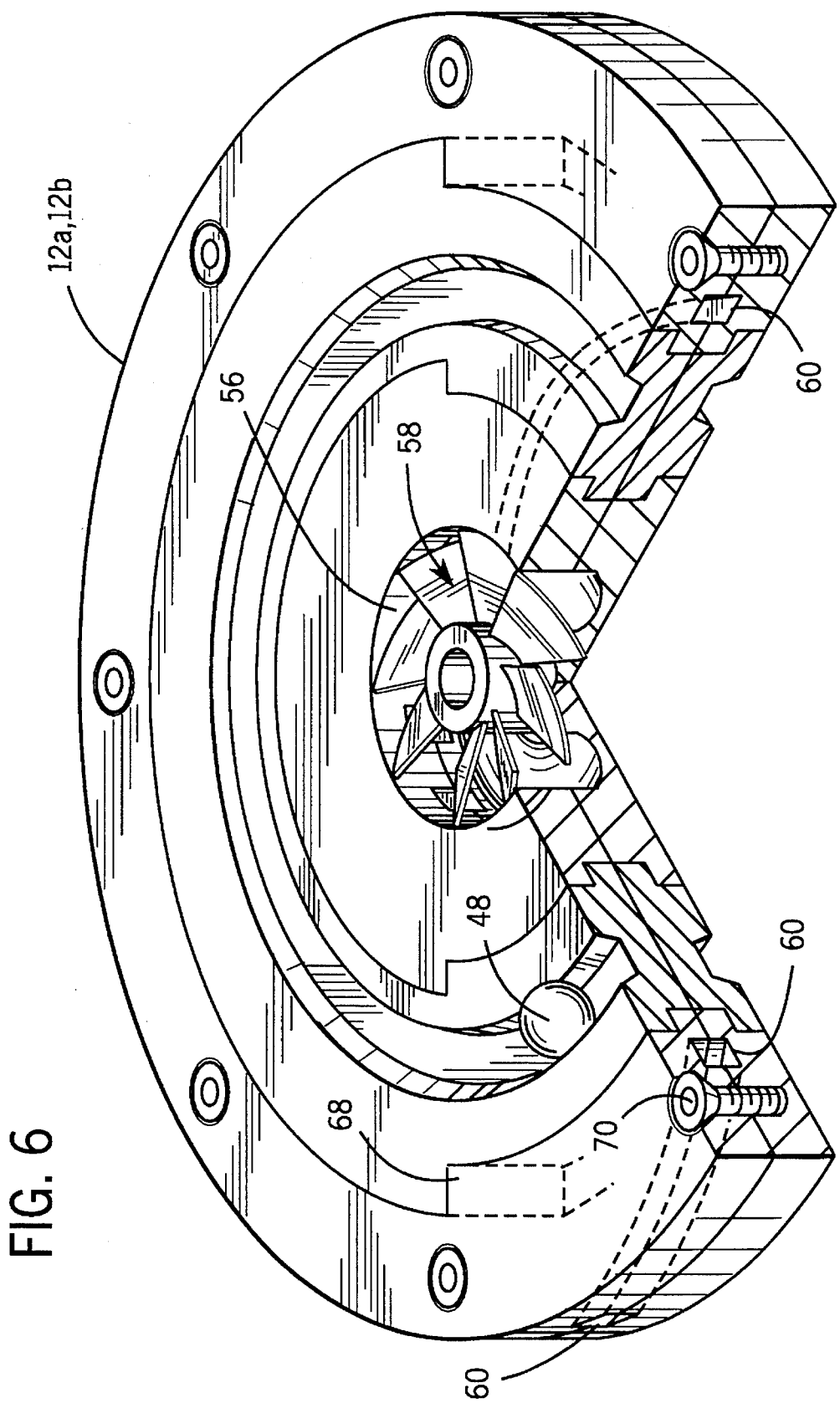
FIG. 6 is a perspective view of the flywheel-impeller shown in FIG. 5 with parts broken away to show the cross-section of several components thereof.

As a salient feature of the invention, each combined flywheel-impeller 12a, 12b is inherently designed to give turbine incipient action and impeller resultant action. As best seen in FIGS. 4–6, each flywheel-impeller 12a, 12b is formed with an input chamber 56 having a plurality of fan blades 58, the rotation of which causes axial flow of incoming air into a series of involute slots or passages 60 which enable communication between input chamber 56 and casing 44a, 44b. The invention contemplates a composite construction of each flywheel-impeller 12a, 12b needed to fulfill the multiple constraints imposed by the needs of minimum weight, maximum kinetic energy, and maximum capability to withstand centrifugal force. In particular, each flywheel-impeller 12a, 12b has an innermost ring 62, preferably constructed of aluminum, which because of its low density, acts as a steerer of incoming air into involute passages 60 of flywheel-impeller 12a, 12b without adding much weight at a small diameter. Each flywheel-impeller 12a, 12b also includes an intermediate ring 64 preferably composed of stainless steel having a tensile strength on the order of 150,000–180,000 lb./inch$^2$. An outermost ring 66, preferably comprised of titanium, has a lower density than stainless steel which gives it greater velocity while maintaining superior tensile strength in the order of 200,000 lbs./inch$^2$. Each of the flywheel-impellers 12a, 12b is pieced together at various ring-to-ring interfaces defined by offset notches 68 and the upper and lower halves of each flywheel-impeller 12a, 12b are tightly held together by throughbolts 70. Flywheel-impellers 12a, 12b are caused to spin in opposite directions at substantially the same speed so as to create cancelling momentum vectors. Without implementing momentum cancellation, the momentum vector of each individual flywheel-impeller 12a, 12b would be sufficiently great to induce instability in the vehicle when gyroscopic precession occurs. This phenomenon could produce undesirable vehicle rotation, e.g., lifting the left side wheels from the pavement when a bump in the road at the front wheels rotates the vehicle up front to back.

Referring back to FIG. 1, vehicle drive system 10 includes a number of pressure or electrically actuated, computer controlled valves V1–V6, as represented in the drawings by small rectangles. For example, air inlet conduit 34 includes a first port 72 having a three stage spin-up valve V1 having output discretes C1, C2, C3 used during a charge-up mode for bringing the flywheel-impellers 12a, 12b up to 4,000 radians per second in a five minute charge-up interval. This is accomplished by a focused nozzle where low velocity, high volume air is succeeded by two levels of increased velocity and reduced volume air. Spin-up valve V1 enables the velocity of the incoming air to continue to match the peripheral speed of flywheel-impeller 12a, 12b as the velocity increases. A second port 74 has a valve V2 having an output discrete C4 used for sucking ambient air from beneath the vehicle during a run mode. A valve V4 having output discrete C5 is used to control the output of compressed air between flywheel-impeller assembly 12 and air tank(s) 14 while a valve V6 having output discrete C9 is employed to selectively vent compressed air from flywheel-impeller assembly 12 to the atmosphere. A pressure regulated valve V5 having an output discrete C6 is connected to air tank(s) 14 and functions to admit a predetermined amount of air pressure, namely 120–140 p.s.i., to a pre-manifold plenum 40. Plenum 40 is equipped with a series of internal baffles to slow the advance of pressure entering therein and cooperates with a foot-operated throttle valve 76 acting as an accelerator to deliver up to 120 p.s.i. of air pressure to converted 4-cylinder IC engine 22 with cam adaptations for a 2-cycle operation. An oil system 29 is included for lubricating the various drive components. Also connected to flywheel-impeller assembly 12 is a valve V3 having output discrete C7 and vacuum pump 16 having output discrete C8. Vacuum pump 16 is operably connected to computer 30 via switches SW1 and SW2 which are connected to a generator 78 driven by a supplementary air motor 80 receiving compressed air from regulated line 82. Generator 78 is used to provide power to an accessory battery 84, a heater/air conditioner 86, lights 88, radio 90, and displays 92. Computer 30 also monitors a series of sensor inputs, namely S1, the speed or angular velocity of first flywheel-impeller 12a, S2, the speed or angular velocity of second flywheel-impeller 12b, S3, the pressure of the air tank(s) 14 and S4, the pressure of pre-manifold plenum 40.

The aforedescribed vehicle drive system 10 is employed during a charge-up phase to spin-up flywheel-impellers 12a, 12b to 4,000 radians per second (650 revolutions per second) with a minimum of special mechanization, and to reduce, during a subsequent run mode, the windage and friction losses to levels which support running on one spin-up for up to 48 hours and beyond, if the drive scenario is dominated by low torque demands. Lengths of run times are based, in this example design, on certain assumed values of design parameters, which in composite, provide compatibility with system, safety, comfort and operational features of current automobiles, but are not intended to restrict similar coverage using other sets of parameters. To this end, the portrayed system is based on a stored kinetic energy of 182 hp-hours and an estimated scenario of events regarding accelerations, idling, and run times shown in Table 1.

TABLE 1

TYPICAL HORSEPOWER-TIME SCENARIOS
FOR A NOMINAL 180 HP AUTO OVER 15 HOUR PERIOD

| Condition | H–P | Hours | H–P Hours (Max) |
|---|---|---|---|
| 1. Idling | 1–3 | 8 | 24 |
| At stop sign, parking, little motor air being used. Impellers have blocked input and output except when replenishing tanks. Vacuum pump running - approximately 0.005 p.s.i. maintained in casings. Auxiliary loads on: radio, heater, computer. | | | |
| 2. Coasting | 3HP | 6 | 18 |
| Level or downhill; Impelling, mostly with blocked input/output or cycling. | | | |
| 3. Accelerating from sta- | 150 | 0.3 | 45 |

TABLE 1-continued

TYPICAL HORSEPOWER-TIME SCENARIOS
FOR A NOMINAL 180 HP AUTO OVER 15 HOUR PERIOD

| Condition | H-P | Hours | H-P Hours (Max) |
|---|---|---|---|
| tionary to 35 MPH Typical park-to-run, 100 times at 10 seconds each. | | | |
| 4. Running up-hill From 25 to 50 MPH; 12 times, 1 minute each; 20° upgrades. | 175 | 0.2 | 35 |
| 5. Running level, at 50 to 70 MPH | 30 | 2 | 60 |
| Windage, friction, efficiency drops are loss factors. Impeller output is cycling at 60 second to 5 minute intervals during part of which tank pressure is being re-charged by impellers. | | | |
| TOTAL HP-HOURS | | | 182 |
| All conditions have the impellers running at the speed relating to the remaining energy available. The computer driven valves and manual inputs determine the running status, e.g. at 1 H-P in Condition 1, the impellers can still support, after 40 hours of parking, 6 hours of local errands, but then require a re-charge. | | | |

Table 2 is a listing of sequential events transpiring during the charge-up and run modes in terms of the opening and closing of various ports, valves, sensors and output discretes.

TABLE 2

| Conditions | | | |
|---|---|---|---|
| Charge-Up | | | |
| Low Speed: | Port 72 open V1-C1 open V1-C2 open V1-C3 open V2 Closed (Port 74) | | |
| Mid-Speed: | Port 72 open V1-C1 closed V1-C2 open V1-C3 open V2 closed (Port 74) | | |
| High Speed: | Port 72 open V1-C1 closed V1-C2 closed V1-C3 open V2 closed (Port 74) S1, S2 ≧ 4000 Radians/Second S3 ≧ 500 p.s.i. | | |

| Run | | | (Draw in in Ambient Air) |
|---|---|---|---|
| Tank Only: | Port 72 closed All V1 closed V-2 closed, C4 = 0 V4 closed V6 closed after 5 sec. open V3 opens, casings evacuate V5, C6 cyclical to hold S4 to 120 psi S3 ≦ 500 psi until S3 ≦ 140 psi Go to: Impeller Replenish | Impeller Replenish: S3 ≦ 140 psi | Port 72 closed All V1 open V2 open (Port 74) S3 ≦ 140 psi, then V4 opens V5, C6 cyclical to hold S4 to 120 psi S3 ≧ 500 psi Back to "Tank Only" |

In the charge-up phase, a 500 p.s.i air supply is connected to port 72. SW1 is set to ON (SW2 is OFF) and all output discretes C1–C9 are off. C1, C2 and C3 are set by the computer to ON. When sensors S1 and S2 reach 300 RPS, C1 is set to OFF and C5 and V4 are set to ON. When sensors S1 and S2 reach 400 RPS, C2 is set to OFF. When sensors S1 and S2 reach 650 RPS, tank(s) 14 should be at 500 p.s.i., and sensor S3 relays this information to computer 30. C1, C2 and C3 are then set to OFF, closing V1. Air supply is removed from port 72. V4 is then closed by C5. V6 is opened by C9 and the compressor internal pressure drops to less than 15 p.s.i. This completes spin-up. Flywheel-impellers 12a, 12b are up to speed and tank(s) 14 are filled to 500 p.s.i. C7 and C8 are turned on, evacuating air from the combined flywheel-impellers 12a, 12b acting as compressors letting them run without being impeded by trapped air. C9 is turned off and V6 closes, making vacuum pump 16 effective in further reducing compressor internal pressure.

There are two modes of the run phase. In the first mode, tank air only is being used for the drive with flywheel-impellers 12a, 12b running in near vacuum to conserve energy. This mode lasts until the tank pressure sensor S3 drops to 140 p.s.i. In the second mode with tank air between pressures of 140 and 120 p.s.i., the compressors 12a, 12b are replenishing tank air pressure to 500 p.s.i. Starting from the charge-up phase conclusion, SW2 is manually switched on, enabling all computer operations. V5 is open, sending 500 p.s.i. air to the 120 p.s.i. plenum. The baffles in plenum 40 cause a rapid build up from 15 p.s.i. to 120 p.s.i. When the plenum pressure reaches 125 p.s.i., V5 is closed. The drive system 10 is now ready for foot operation of the accelerator via throttle valve 76, which admits 120 p.s.i. air to the engine inlet manifold 46 and the first cylinder of engine 22 whose inlet valve is open by previous cam action and whose piston is slightly advanced beyond the 5° down position. When sensor S4 shows the plenum pressure lower than 120 p.s.i. due to the engine work done, V5 opens driving the plenum pressure back to 125 p.s.i, then closes. The foregoing fast cycling continues until the pressure in the tank(s) 14 drops from 500 p.s.i. to 140 p.s.i. as indicated by sensor S3. At this point, the tank(s) 14 needs air pressure replenishment by the compressors 12a, 12b. V1 and V2 open, V3 closes and V4 opens. The compressors 12a, 12b pull air through V1 and V2, drive it into the tank(s) 14 until sensor S3 reads 500 p.s.i., at which the slow cycle repeats and the compressors go back into the tank air only mode of the run phase which simultaneously returns the compressor internal pressure to near vacuum.

During the charge-up mode, air is forced into the input chamber 56 of flywheel-impeller 12a, 12b from the off board supply or service station, at a pressure of 500 p.s.i. through air inlet conduit 34. The shape of the blades 58 at input chamber 56 directs the air axially and then radially into involute passages 60 which follow a nearly circular path to the periphery of flywheel-impeller 12a, 12b. Turbine-like action occurs at this point. The curved passages 60 cause a component of velocity to act tangentially against the passage sides, giving a starting torque and resulting angular acceleration to the flywheel-impellers 12a, 12b. Once started, the rotation of the flywheel-impellers 12a, 12b sets up centrifugal forces which push the air radially into recovery chute 45 in casing 44a, 44b, then into input chamber 56 of flywheel-impeller 12a, 12b for a repetition of the process. The primary goal of this mode is to spin-up the flywheel-impellers 12a, 12b and store 182 HP hours of kinetic energy plus a nominal amount of potential energy in the tanks 14a, 14b for early in-line reaction to power demands. There should not be any significant change in the temperature of source to stored air in this mode. The work done is mostly recoverable in subsequent operations.

During the run mode, air is taken from the ambient area, elevated in pressure and velocity by the passively operating flywheel-impellers 12a, 12b and used to keep tank(s) 14 pressurized and ready to supply the acceleration demands upon the air engine 22 (or turbine). Flywheel-impellers 12a, 12b are now the primary power source. Compression will raise the temperature of the air from 60° F. average ambient temperature to 150° F. This should not affect adversely the using subsystem performance. In engine 22 being used as the pressure-to-crankshaft converter, expansion against pressure occurs during each work stroke of the 2-cycle operation, the other stroke is the exhaust stroke against minuscule back pressure. During both strokes, the temperature will drop due to expansion. The earlier temperature rise should prevent freezing of inherent moisture at the engine output.

The reduction of windage resistance within the compressors 12a, 12b during portions of the run mode, vital to the long term provision of useful energy, is enhanced by the shut off of input air when the air tank(s) 14 is fully charged to 500 p.s.i. By shutting off input air, followed 5 seconds later by closing output valve V6 of flywheel-impeller casings 44a, 44b, compressors 12a, 12b exhaust the air within casings 44a, 44b estimated to drop the pressure from 500 p.s.i. down to 5 p.s.i. Further evacuation is conducted by vacuum pump 16 which reduces the internal pressure of casings 44a, 44b to 0.005 p.s.i. Thus, during a spectrum of operating demands from idling to long coasting to low power to full acceleration, the power needs of the vehicle are supplied by tanks 14a, 14b while flywheel-impellers 12a, 12b revolve in vacuum. It should also be realized that low running friction is critical to the success of storage and delivery system. To this end, retainer rings 50 separating ball bearings 48 are aided in maintaining a small 0.02" clearance along its sides facing flywheel-impeller 12a, 12b and casing 48a, 48b by forcing a small amount of residual air in a backward involute groove 56a and having it exert the necessary force to maintain the required spacing. A well of volatile fluid such as WD-40 is placed in first port 72 introducing air into input chamber 56 of flywheel-impeller 12a. This well consists of steel wool soaked with the volatile fluid in a suitable container. The passage of high velocity air into input chamber 56 aspirates vapor into flywheel-impeller assembly 12, some of which lubricates the ball bearing grooves 46.

Figure 7:
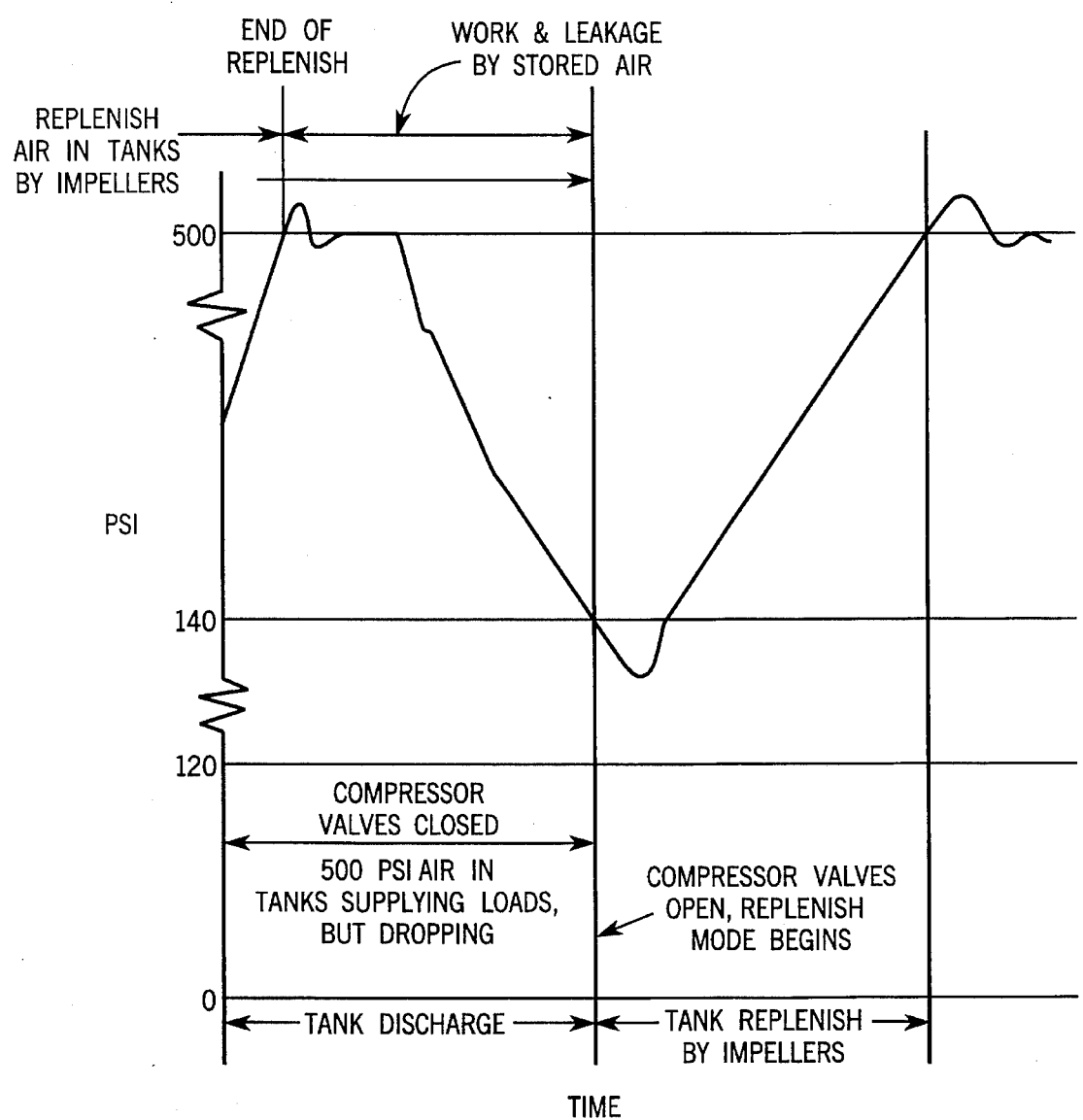
FIG. 7 is a pressure vs time profile showing a hypothetical ratio of compressor valves used in the present invention.
Figure 8A:
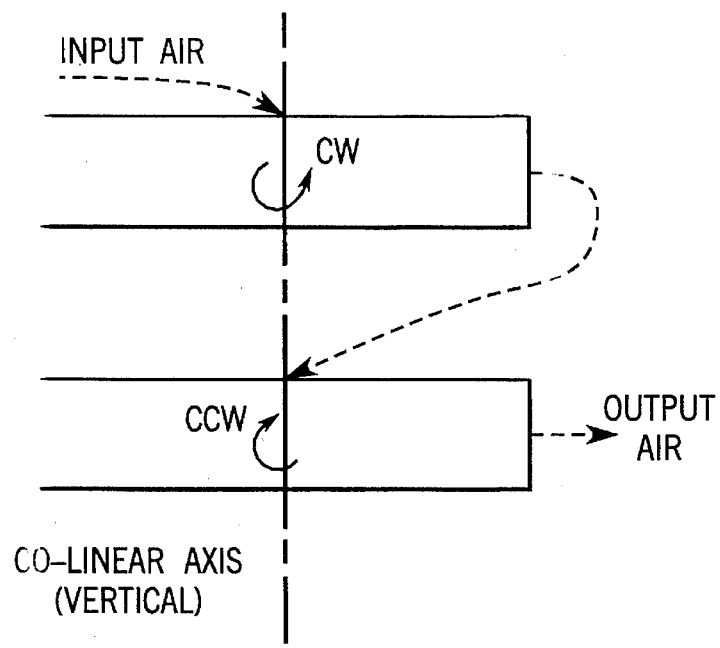
FIGS. 8a and 8b are diagrammatic representations of alternative arrangements of the flywheel-impeller contemplated in the present invention.
Figure 8B:
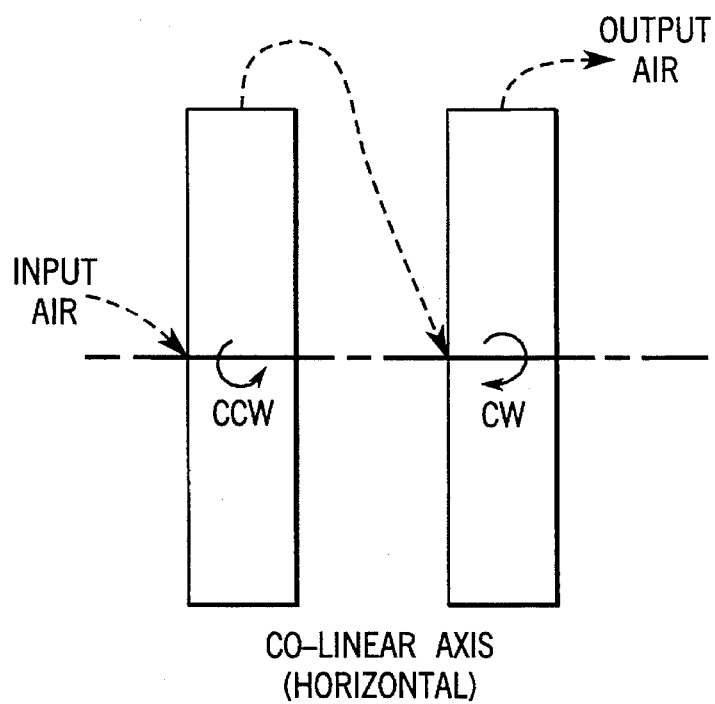

FIG. 7 illustrates the pressure vs. time profile depicting the operating characteristics of each mode as previously described. For example, the solid line indicates the ratio of tank pressure supply time vs. compression to replenish time for a medium demand system. Once the system has been charged up to 500 p.s.i., the negative slope on the profile represents the exhaustion of the tanks supply alone to 140 p.s.i., at which time computer 30 sets the valves V1, V2 to open position and the flywheel-impellers 12a, 12b then recharge to 500 p.s.i. even if the output engine 22 is using and exhausting air at maximum rate. The position in the operating spectrum and the remaining flywheel-impeller speed determine the on/off time ratio of the valve cycle in the spectrum. It should be appreciated that flywheel-impellers 12a, 12b move relentlessly, being slowed down only by the mass of air they are called upon to pump. On board computer control determines and commands these events along with driver motivation. When the air in tank(s) 14 is nearly exhausted, dropping from 500 p.s.i. to 140 p.s.i., compressors 12a, 12b are brought back to effective action by sensor/computer/valve operation. The lower threshold of the effective linear operation in output engine 22 is 0–120 p.s.i. which, when acting against the upper surface of one of the engine pistons, produces a downward pressure and supports a 3,000 RPM crankshaft speed consistent with current transmissions with the 182 HP-hour operation. The cycle range deriving from these trade-offs could range from 3 minutes to one hour, depending on the demand for power and the remaining flywheel-impeller speed.

It should be appreciated that the present invention provides a compressed air based vehicle drive system 10 which eliminates the gas tank, fuel pump, ignition system, internal combustion engine in the combustion mode, exhaust system including manifold, muffler and catalytic converter; fuel injection, air cleaner, radiator and liquid cooling systems. Flywheel-impellers 12a, 12b are configured with high moments of inertia, high tensile strength, momentum cancellation, ball bearing support at large diameter for weight imbalance tolerance, and programmed reduction of internal compressor windage during periods of power demand reduction when air tanks 14a, 14b are able to provide the required air and casings 44a, 44b are evacuated. Unlike the prior art, there is no need to drive the compressors by engines or motors, there is no need to resort to inefficient air cylinder power and there is no need to worry about potentially dangerous electric fields.

While the invention has been described with reference to a preferred embodiment, it will be understood by those skilled in the art that various changes may be made and equivalence may be substituted for elements thereof without departing from the scope of the invention. For example, in lieu of the aluminum materials used in stationary elements such as the casings and vehicle chassis, a fiber composite material may be substituted to yield great strength with lightness. However, fiber composite material, while acceptable for the center ring of the flywheel-impeller, does not have the mass for the outer two rings required to produce the needed kinetic energy at attainable velocity. If fiber composites are used as the center ring of the flywheel-impeller, it is an innovative alternative to incorporate a nickel or iron powder in the carbon fiber slurry when baking and forming the resin binder for the composite. Such would take the place of the paramagnetic titanium outer ring used in providing an indication of the angular velocity of the flywheel-impeller. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A vehicle drive system powered by a source of compressed air, and also having a source of ambient air, to provide power to said drive system with a minimum of energy loss, said drive system comprising:

a vehicle drive wheel;

a main air motor connected with and adapted to drive said wheel;

a combined, rotatable flywheel-impeller assembly disposed in a casing acting during a charge-up phase to spin-up with the compressed air from said source and acting during a run phase to alternately compress the ambient air and subsequently deliver the resulting compressed air to said air motor;

an air tank connected to said main air motor and adapted to store compressed air from said flywheel-impeller assembly;

a means for evacuating said casing to reduce energy loss when power is not required from said flywheel-impeller assembly; and a controller connected to said flywheel-impeller assembly, said air tank and said main air motor and operable to automatically and continuously control the flow of compressed air between said flywheel-impeller assembly and said air tank and between said air tank and said main air motor in response to the demand for compressed air required by said main air motor to drive said wheel.

2. The vehicle drive system of claim 1, including a vehicle framework mounted on said vehicle drive wheel and supporting said flywheel-impeller assembly and said air tank, said vehicle framework comprising a plurality of air conduits adapted to store and transport compressed air between said flywheel-impeller assembly and said main air motor.

3. The vehicle drive system of claim 1, a portion of said flywheel-impeller assembly being rotatable about an axis of rotation and having an input chamber surrounding said axis of rotation.

4. The vehicle drive system of claim 3, said flywheel-impeller assembly further including a plurality of fan blades disposed in said input chamber and extending radially outwardly from said axis of rotation.

5. The vehicle drive system of claim 4, said flywheel-impeller assembly further including a plurality of involute passages formed therein in communication with said input chamber.

6. The vehicle drive system of claim 1, wherein said flywheel-impeller assembly includes a series of three concentric rings including an outer titanium ring, an intermediate stainless steel ring and an inner aluminum ring.

7. The vehicle drive system of claim 1, including a pressure regulated valve, a pre-manifold regulated chamber and a throttle valve connected serially between said air tank and said main air motor.

8. The vehicle drive system of claim 7, said main air motor having an intake manifold adapted to convert compressed air via said throttle valve to torque deliverable to said vehicle drive wheel.

9. The vehicle drive system of claim 7, including a supplementary air motor connected between said pressure regulated valve and said pre-manifold regulated chamber and a generator driven by said supplementary air motor defining a source of electrical energy for the vehicle.

10. A vehicle drive system powered by a source of compressed air to provide power to said drive system with a minimum of energy loss, said system comprising:

a vehicle drive wheel means;

air motor means operably connected with said wheel means for driving said wheel means;

casing means having an inlet for receiving air to be compressed;

integral flywheel-impeller means mounted for rotation in and relative to said casing means for compressing air in said casing means;

a means for evacuating said casing means to reduce energy loss when power is not required from said flywheel-impeller means;

air tank means operably connected with said casing means for storing the resulting compressed air from the flywheel-impeller means and deliverable to said air motor means; and controller means operably connected to said flywheel-impeller means, said air tank means and said air motor means for selectively supplying and replenishing the compressed air at a predetermined pressure to said air tank means in response to the demand for air required by said air motor means to drive said wheel means.

11. The vehicle drive system of claim 10, wherein said air tank means is chargeable to 500 p.s.i.

12. The vehicle drive system of claim 10, wherein said flywheel-impeller means is continuously operable during a charge-up phase and a run phase.

13. A vehicle drive system powered by compressed air to provide power to said drive system with a minimum of energy loss, said drive system comprising:

a vehicle drive wheel;

an air motor connected with and adapted to drive said wheel;

a casing having a first inlet for receiving air from the compressed air source during a charge-up phase and a second inlet for receiving air from an ambient source beneath the vehicle during a run phase having a first mode for compressing air from said source and a second mode for delivering compressed air to said air motor;

a pair of contiguous, counter-rotating flywheel-impellers in communication with each other and adapted to compress air in said casing during said first mode of said run phase;

an air tank connected with said casing for receiving and storing compressed air deliverable to said air motor;

a means for evacuating said casing to reduce energy loss when power is not required from said flywheel-impellers; and a controller operably connected to said casing, said air tank and said air motor and operable to control the flow of compressed air between said casing and said air tank and between said air tank and said air motor in response to the demand for air required by said air motor to drive said vehicle wheel.

14. The vehicle drive system of claim 13, wherein each of said flywheel-impellers are mounted for rotation in horizontal planes within said casing.

15. The vehicle drive system of claim 13, wherein each of said flywheel-impellers comprises a series of three concentric rings including an outer titanium ring, an intermediate stainless steel ring and an inner aluminum ring.

16. The vehicle drive system of claim 15, wherein said casing and said intermediate stainless steel ring are formed with a plurality of aligned grooves.

17. The vehicle drive system of claim 16, wherein each of said aligned grooves receives a ball bearing.

18. The vehicle drive system of claim 13, including a spin-up valve connected to said casing for increasing the velocity of air delivered thereto.

19. The vehicle drive system of claim 13, wherein each of said flywheel-impellers act as an air turbine during said charge-up phase and as an air compressor during said run phase.

20. The vehicle drive system of claim 13, wherein said evacuating means includes vacuum pump connected to said casing.

21. The vehicle drive system of claim 13, wherein said flywheel-impellers are mounted on the same axis.

22. The vehicle drive system of claim 13, wherein said flywheel-impellers are mounted in the same plane.

* * * * *